(12) United States Patent
Kobyakov et al.

(10) Patent No.: US 8,275,265 B2
(45) Date of Patent: Sep. 25, 2012

(54) DYNAMIC CELL BONDING (DCB) FOR RADIO-OVER-FIBER (ROF)-BASED NETWORKS AND COMMUNICATION SYSTEMS AND RELATED METHODS

(75) Inventors: Andrey Kobyakov, Painted Post, NY (US); Michael Sauer, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 474 days.

(21) Appl. No.: 12/705,779

(22) Filed: Feb. 15, 2010

(65) Prior Publication Data

US 2011/0200325 A1    Aug. 18, 2011

(51) Int. Cl.
*H04B 10/08* (2006.01)
(52) U.S. Cl. .............. 398/115; 398/5; 398/25; 398/116; 398/117
(58) Field of Classification Search ........... 398/115–117
See application file for complete search history.

(56) References Cited

U.S. PATENT DOCUMENTS

| | | |
|---|---|---|
| 4,365,865 A | 12/1982 | Stiles |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,299,947 A | 4/1994 | Barnard |
| 5,301,056 A | 4/1994 | O'Neill |
| 5,325,223 A | 6/1994 | Bears |

(Continued)

FOREIGN PATENT DOCUMENTS

AU    645192 B    10/1992

(Continued)

OTHER PUBLICATIONS

A.J. Cooper, "Fiber/Radio for the Provision of Cordless/Mobile Telephony Services in the Access Network," Electronics Letters, vol. 26, pp. 2054-2056, 1990.

(Continued)

*Primary Examiner* — Danny Leung
(74) *Attorney, Agent, or Firm* — C. Keith Montgomery

(57) ABSTRACT

Communication devices, systems, and methods for dynamic cell bonding (DCB) for Radio-over-Fiber (RoF)-based networks and communication systems are disclosed. In one embodiment, a method of operating an optical fiber-based wireless communication system is provided. The method includes determining a first plurality of remote units in a cloud bonded to a Radio-over-Fiber (RoF) communication session. The method also includes measuring a received signal strength from each of the first plurality of remote units. The method also includes measuring a received signal strength from each of a second plurality of remote units in the cloud not bonded to the RoF communication session. At least one of the second plurality of remote units is dynamically bonded to the RoF communication session if the measured received signal strength of the one of the second plurality of remote units is greater than the measured received signal strength of the first plurality of remote units.

26 Claims, 12 Drawing Sheets

U.S. PATENT DOCUMENTS

| | | |
|---|---|---|
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,400,391 A | 3/1995 | Emura et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,668,562 A | 9/1997 | Cutrer et al. |
| 5,677,974 A | 10/1997 | Elms et al. |
| 5,682,256 A | 10/1997 | Motley et al. |
| 5,703,602 A | 12/1997 | Casebolt |
| 5,790,606 A | 8/1998 | Dent |
| 5,802,473 A | 9/1998 | Rutledge et al. |
| 5,805,983 A | 9/1998 | Naidu et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,838,474 A | 11/1998 | Stilling |
| 5,854,986 A | 12/1998 | Dorren et al. |
| 5,859,719 A | 1/1999 | Dentai et al. |
| 5,867,485 A | 2/1999 | Chambers et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,088,381 A | 7/2000 | Myers, Jr. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,314,163 B1 | 11/2001 | Acampora |
| 6,323,980 B1 | 11/2001 | Bloom |
| 6,324,391 B1 | 11/2001 | Bodell |
| 6,337,754 B1 | 1/2002 | Imajo |
| 6,353,406 B1 | 3/2002 | Lanzl et al. |
| 6,353,600 B1 | 3/2002 | Schwartz et al. |
| 6,359,714 B1 | 3/2002 | Imajo |
| 6,374,078 B1 | 4/2002 | Williams et al. |
| 6,374,124 B1 | 4/2002 | Slabinski |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,477,154 B1 | 11/2002 | Cheong et al. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,525,855 B1 | 2/2003 | Westbrook et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,675,294 B1 | 1/2004 | Gupta et al. |
| 6,687,437 B1 | 2/2004 | Starnes et al. |
| 6,690,328 B2 | 2/2004 | Judd |
| 6,704,545 B1 | 3/2004 | Wala |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,337 B2 | 11/2004 | Linnell |
| 6,847,856 B1 | 1/2005 | Bohannon |
| 6,865,390 B2 | 3/2005 | Goss et al. |
| 6,873,823 B2 | 3/2005 | Hasarchi et al. |
| 6,879,290 B1 | 4/2005 | Toutain et al. |
| 6,883,710 B2 | 4/2005 | Chung |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,020,473 B2 | 3/2006 | Splett |
| 7,035,512 B2 | 4/2006 | Van Bijsterveld |
| 7,039,399 B2 | 5/2006 | Fischer |
| 7,047,028 B2 | 5/2006 | Cagenius |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |

| Patent/Publication | Date | Inventor(s) |
|---|---|---|
| 7,106,931 B2 | 9/2006 | Sutehall et al. |
| 7,114,859 B1 | 10/2006 | Tuohimaa et al. |
| 7,127,176 B2 | 10/2006 | Sasaki |
| 7,142,503 B1 | 11/2006 | Grant et al. |
| 7,160,032 B2 | 1/2007 | Nagashima et al. |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,366,150 B2 | 4/2008 | Lee et al. |
| 7,379,669 B2 | 5/2008 | Kim |
| 7,388,892 B2 | 6/2008 | Nishiyama et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,496,070 B2 | 2/2009 | Vesuna |
| 7,496,384 B2 | 2/2009 | Seto et al. |
| 7,522,552 B2 | 4/2009 | Fein et al. |
| 7,548,695 B2 | 6/2009 | Wake |
| 7,590,354 B2 | 9/2009 | Sauer et al. |
| 2002/0003645 A1 | 1/2002 | Kim et al. |
| 2002/0012495 A1 | 1/2002 | Sasai et al. |
| 2002/0048071 A1 | 4/2002 | Suzuki et al. |
| 2002/0075906 A1 | 6/2002 | Cole et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0126967 A1 | 9/2002 | Panak et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0100930 A1 | 5/2004 | Shapira et al. |
| 2004/0126068 A1 | 7/2004 | Van Bijsterveld |
| 2004/0149736 A1 | 8/2004 | Clothier |
| 2004/0151503 A1 | 8/2004 | Kashima et al. |
| 2004/0157623 A1 | 8/2004 | Splett |
| 2004/0162115 A1 | 8/2004 | Smith et al. |
| 2004/0162116 A1 | 8/2004 | Han et al. |
| 2004/0175173 A1 | 9/2004 | Deas |
| 2004/0202257 A1 | 10/2004 | Mehta et al. |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0045054 A1 | 3/2006 | Utsumi et al. |
| 2006/0062579 A1 | 3/2006 | Kim et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0233506 A1 | 10/2006 | Noonan et al. |
| 2006/0239630 A1 | 10/2006 | Hase et al. |
| 2007/0009266 A1 | 1/2007 | Bothwell et al. |
| 2007/0058978 A1 | 3/2007 | Lee et al. |
| 2007/0071128 A1 | 3/2007 | Meir et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0274279 A1 | 11/2007 | Wood et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0056167 A1 | 3/2008 | Kim et al. |
| 2008/0058018 A1 | 3/2008 | Scheinert |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0145061 A1 | 6/2008 | Lee et al. |
| 2008/0150514 A1 | 6/2008 | Codreanu et al. |
| 2008/0194226 A1 | 8/2008 | Rivas et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253773 A1 | 10/2008 | Zheng |
| 2008/0260388 A1 | 10/2008 | Kim et al. |
| 2008/0273844 A1 | 11/2008 | Kewitsch |
| 2008/0298813 A1 | 12/2008 | Song et al. |
| 2008/0304831 A1 | 12/2008 | Miller, II et al. |
| 2008/0310848 A1 | 12/2008 | Yasuda et al. |

| | | | |
|---|---|---|---|
| 2009/0041413 | A1 | 2/2009 | Hurley |
| 2009/0047023 | A1 | 2/2009 | Pescod et al. |
| 2009/0061939 | A1 | 3/2009 | Andersson et al. |
| 2009/0135078 | A1 | 5/2009 | Lindmark et al. |
| 2009/0154621 | A1 | 6/2009 | Shapira et al. |

FOREIGN PATENT DOCUMENTS

| | | |
|---|---|---|
| AU | 731180 | 3/1998 |
| CA | 2065090 C | 4/1992 |
| CA | 2242707 | 9/2002 |
| DE | 20104862 U1 | 9/2001 |
| DE | 10249414 A1 | 5/2004 |
| EP | 0477952 A2 | 4/1992 |
| EP | 0461583 B1 | 3/1997 |
| EP | 0687400 B1 | 11/1998 |
| EP | 0993124 A2 | 4/2000 |
| EP | 1037411 A2 | 9/2000 |
| EP | 1267447 B1 | 1/2001 |
| EP | 1179895 A1 | 2/2002 |
| EP | 1202475 A1 | 5/2002 |
| EP | 1267447 A1 | 12/2002 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1693974 A1 | 8/2006 |
| EP | 1742388 A1 | 1/2007 |
| EP | 1227605 B1 | 1/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05260018 | 10/1993 |
| JP | 09083450 | 3/1997 |
| JP | 09162810 | 6/1997 |
| JP | 09200840 A | 7/1997 |
| JP | 11068675 | 3/1999 |
| JP | 2000152300 | 5/2000 |
| JP | 2000341744 | 12/2000 |
| JP | 2002264617 | 9/2002 |
| JP | 2003148653 | 5/2003 |
| JP | 2003172827 | 6/2003 |
| JP | 2004172734 | 6/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005087135 | 4/2005 |
| JP | 2005134125 | 5/2005 |
| JP | 2007228603 | 9/2007 |
| JP | 2008172597 | 7/2008 |
| WO | 9810600 A1 | 3/1998 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059074 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006/060754 A2 | 6/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |

OTHER PUBLICATIONS

Bakaul., M., Nirmalathas, A., Lim, C., Novak, D., and Waterhouse, R., "Efficient Multiplexing Scheme for Wavelength-Interleaved DWDM Millimeter-Wave Fiber-Radio Systems," IEEE Photonics Technology Letters, vol. 17, No. 12, Dec. 2005.

D. Huang, C. Chiu, "A WLAN-Used Helical Antenna Fully Integrated with the PCMCIA Carrier," IEEE Trans. Ant. and Prop., vol. 53, No. 12, pp. 4164-4168, Dec. 2005.

Gibson et al., "Evanescent Field Analysis of Air-Silica Microstructure Waveguides," IEEE, 1-7803-7104-4/01, 2001, pp. 709-710.

Opatic, D., "Radio over Fiber Technology for Wireless Access," Oct. 17, 2009, 6 pages.

International Telecommunication Union, ITU-T G.652, Telecommunication Standardization Sector of ITU, Jun. 2005, Series G: Transmission Systems and Media, Digital Systems and Networks, Transmission Media and Optical Systems Characteristics—Optical Fibre Cables, Characteristics of a Single-Mode Optical Fiber abd Cable, ITU-T Recommendation G.652, 22 pages.

International Telecommunication Union, ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Moreira, J.D., Alemenar, V., Corral, J.L., Flores, S., Girona, A., Corral, P., "Diversity Techniques for OFDM Based WLAN Systems," pp. 1008-1011, PIMRC 2002 IEEE.

Niiho, T., Nakaso, M., Sasai, H., Utsumi, K., and Fuse, M., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58, vol. 1.

Paulraj, A., Gore, D., Nabar, R., and Bolcskei, H., "An Overview of MIMO Communications—A Key to Gigabit Wireless," Proceedings of the IEEE, vol. 92, No. 2, Feb. 2004.

Pickrell et al., "Novel Techniques for the Fabrication of Holey Optical Fibers," Spie Conference Proceedings, vol, 4578, pp. 271-282, 2001.

RFID Technology Overview, 11 pages.

Roh, W. and Paulraj, A., "MIMO Channel Capacity for the Disctributed Antenna Systems," Vehicular Technology Conference, 2002, proceedings, VTC 2002-Fall, 2002 IEEE 56th, vol. 2, Sep. 24-28, 2002, pp. 706-709, vol. 2.

Seto, I., Sekiguchi, T., Matsuoka, H., Tsujimura, A., Sekin, S., Sato, K., Yoshida, H. and Namekata, M., "Antenna-Selective Trasmit Diversity Technique for OFDM-Based WLANs with Dual-Band Printed Antennas," pp. 51-56, IEEE Communications Society/WCNC 2005.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118, vol. 1.

Wake, D. et al., "Passive Picocell: A New Concept n Wireless Network Infrastructure," Electronics Letters, vol. 33, No. 5, Feb. 27, 1997, pp. 404-406.

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

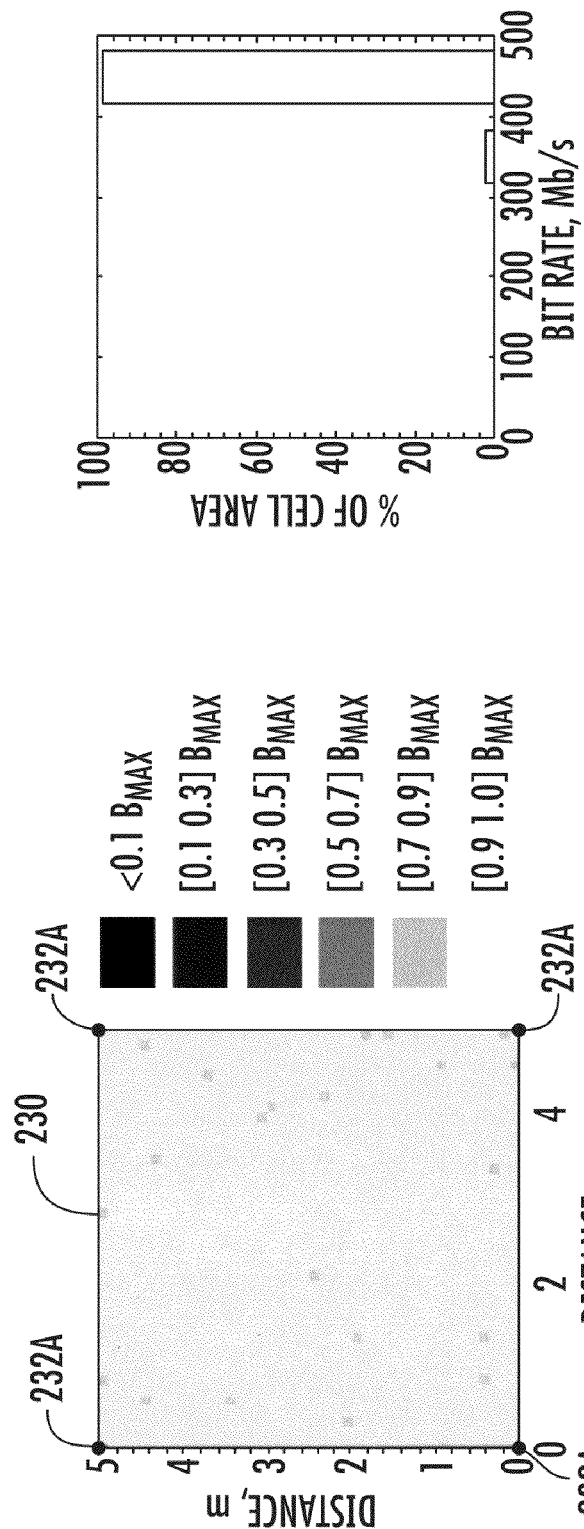

DYNAMIC CELL BONDING (DCB) FOR RADIO-OVER-FIBER (ROF)-BASED NETWORKS AND COMMUNICATION SYSTEMS AND RELATED METHODS

BACKGROUND

1. Field of the Disclosure

The technology of the disclosure relates to dynamic cell bonding (DCB) and, more specifically, to the use of DCB to compensate for the bandwidth limitations of multi-mode optical fiber (MMF).

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells." Picocells are radio frequency (RF) coverage areas having a radius in the range from about a few meters up to about 20 meters. Picocells can be provided to provide a number of different services (e.g., WLAN, voice, radio frequency identification (RFID) tracking, temperature and/or light control, etc.). Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, picocells are created by and centered on a wireless access point device connected to a head-end controller or head-end unit. The wireless access point device includes digital information processing electronics, an RF transmitter/receiver, and an antenna operably connected to the RF transmitter/receiver. The size of a given picocell is determined by the amount of RF power transmitted by the access point device, the receiver sensitivity, antenna gain and the RF environment, as well as by the RF transmitter/receiver sensitivity of the wireless client device. Client devices usually have a fixed RF receiver sensitivity, so that the above-mentioned properties of the access point device mainly determine the picocell size.

One problem that can exist with wireless communication systems is the multi-path (fading) nature of signal propagation. This simply means that local maxima and minima of desired signals can exist over a picocell coverage area. A receiver antenna located at a maximum location will have better performance or signal-to-noise ratio (SNR) than a receiver antenna located in a minimum position. In this regard, signal processing techniques can be employed to improve the SNR of wireless data transmission in such wireless communication systems. For example, special diversity can be utilized in instances involving many access points. Other signal processing techniques include Multiple Input/Multiple Output (MIMO) techniques for increasing bit rates or beam forming for SNR, or wireless distance improvement. These techniques involve multiple antennas separated by a distance such that individual RF channels are formed between the transmitter and receiver. This distance can be less than one (1) foot in some instances.

In addition to the factors affecting SNR, variation in bandwidth response distribution among optical fiber links can also impede wireless data transmission. For example, multi-mode optical fibers (MMF) used in providing communications links can have varying distributions of bandwidth responses thus causing varying loss responses. For example, FIGS. 1A-1C illustrate exemplary MMF bandwidth response distributions to highlight the degree to which similar MMFs having similar defined characteristics can vary in loss. FIG. 1A provides a graph 2A illustrating an exemplary bandwidth response of thirteen (13) MMFs having a 62.5 micrometer ($\mu$m) core measured in a Radio-over-Fiber (RoF) link with an eight hundred fifty (850) nanometer (nm) vertical-cavity surface-emitting laser (VCSEL) measured over a range of input frequencies extending from zero (0) to six (6) GigaHertz (GHz). An exemplary distribution of the bandwidth response 3A of the thirteen (13) MMFs in the graph 2A at five (5) GHz is also illustrated in FIG. 1A to the right of graph 2A. As illustrated in this example, the loss for all measured MMFs is approximately negative eight (−8) decibels (dB) with a relatively large standard deviation between the MMFs having similar defined characteristics. Thus, if the thirteen (13) MMFs illustrated in FIG. 1A were used in a wireless communication system, the picocells formed by each of the MMFs would have a varying loss, even in the case of equal-length MMFs. This variability results in the unpredictable behavior and operation of such wireless systems.

For comparison purposes, FIG. 1B provides a graph 2B illustrating an exemplary bandwidth response of eight (8) MMFs having a fifty (50) $\mu$m core measured in an RoF link with an eight hundred fifty (850) nm VCSEL measured over a range of input frequencies extending from zero (0) to six (6) GHz. An exemplary distribution of the bandwidth response 3B for the eight (8) MMFs at five (5) GHz is also illustrated FIG. 1B to the right of graph 2B. In this example, the bandwidth loss for all measured MMFs is approximately −2.4 dB, with a smaller standard deviation of loss when compared to the standard deviation of loss for the 62.5 $\mu$m core MMFs illustrated in FIG. 1A. However, the fifty (50) $\mu$m core MMFs provided in the example of FIG. 1B may be more expensive than the 62.5 $\mu$m core MMFs provided in the example of FIG. 1A.

Comparing the loss in the 62.5 $\mu$m core MMFs in FIG. 1A to the fifty (50) $\mu$m core MMFs in FIG. 1B, the loss variation is less pronounced for fifty (50) $\mu$m core MMFs than for 62.5 $\mu$m core MMFs. Therefore, depending on the MMF, the link loss among MMFs will have a distribution similar to that illustrated in FIG. 1C.

It would be advantageous to counteract the variations in loss caused by variations in bandwidth distribution of optical fibers used as communication links in wireless communication systems. MMFs having larger variations in bandwidth distribution may be less expensive to employ in wireless communication systems, but may result in unpredictable behavior having a deleterious effect on the operation of optical fiber enabled wireless communication systems. Therefore, it would be advantageous to counteract the variations in loss of MMFs having larger variations in bandwidth distribution among optical fibers having similar defined characteristics.

SUMMARY OF THE DETAILED DESCRIPTION

Embodiments disclosed in the detailed description include communication devices, systems, and methods for dynamic cell bonding (DCB) for Radio-over-Fiber (RoF)-based networks and communication systems. In one embodiment, a method of operating an optical fiber-based wireless communication system is provided. The method comprises determining a first plurality of remote units in a cloud bonded to a communication session, measuring a received signal strength and/or a data rate from each of the first plurality of remote units, measuring a received signal strength and/or an estimated data rate from each of a second plurality of remote units in the cloud not bonded to the communication session, and dynamically bonding one of the second plurality of remote units to the communication session if the measured received signal strength or the estimated data rate of the one of the second plurality of remote units is greater than the measured received signal strength or the data rate of one of the first plurality of remote units.

Alternative embodiments disclosed in the detailed description include a controller for DCB for RoF-based networks and communication systems. In this embodiment, the controller comprises a head end unit configured to determine a first plurality of remote units in a cloud bonded to a communication session, measure a received signal strength and/or a data rate from each of the first plurality of remote units, measure a received signal strength and/or an estimated data rate from each of a second plurality of remote units in the cloud not bonded to the communication session, and dynamically bond one of the second plurality of remote units to the communication session if the measured received signal strength or the estimated data rate of the one of the second plurality of remote units is greater than the measured received signal strength or the data rate of one of the first plurality of remote units.

Alternative embodiments disclosed in the detailed description include a system for DCB for RoF-based networks and communication systems. In this embodiment, the system comprises a plurality of remote units, and a head end unit comprising a controller for directing a signal to the plurality of remote units, wherein the controller is configured to determine a first plurality of remote units in a cloud bonded to a communication session, measure a received signal strength and/or a data rate from each of the first plurality of remote units, measure a received signal strength and/or an estimated data rate from each of a second plurality of remote units in the cloud not bonded to the communication session, and dynamically bond one or several of the second plurality of remote units to the communication session if the measured received signal strength or the estimated data rate of the one of the second plurality of remote units is greater than the measured received signal strength or the data rate of one of the first plurality of remote units.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 8A and 8B are diagrams illustrating signal strength and bit rate within an exemplary square elementary cell employing dynamic cell bonding (DCB);

DETAILED DESCRIPTION

Figure 1A:
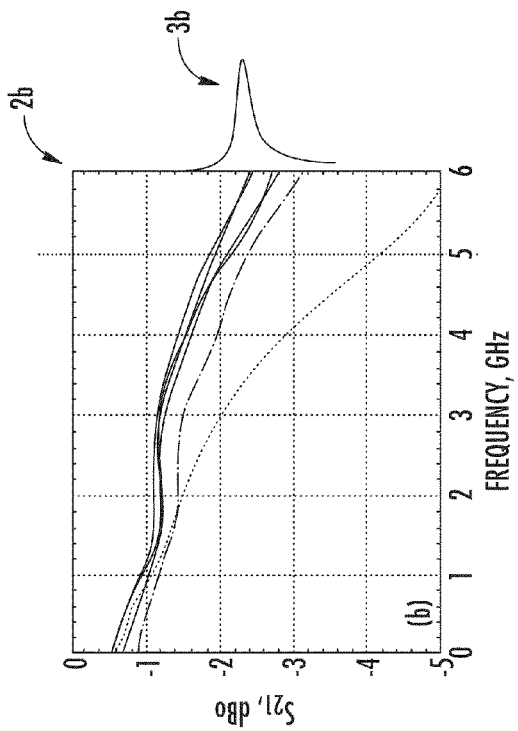
FIGS. 1A-1C are diagrams illustrating exemplary varying bandwidth distributions and losses among multi-mode optical fibers (MMFs) having similarly defined characteristics.
Figure 1B:
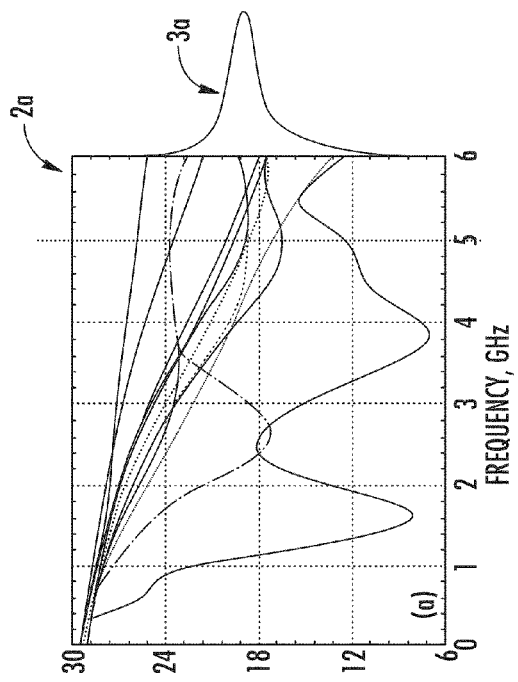
Figure 1C:
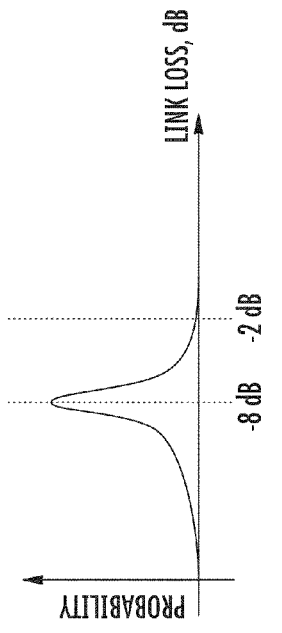

Reference will now be made in detail to the preferred embodiments of the present invention, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

There is described below, in exemplary and non-limiting embodiments, embodiments that include communications devices, systems, and methods for dynamic cell bonding (DCB) for Radio-over-Fiber (RoF)-based networks and communication systems. In one embodiment, a method of operating an optical fiber-based wireless communication system is provided. The method comprises determining a first plurality of remote units in a cloud bonded to a communication session, measuring a received signal strength and/or a data rate from each of the first plurality of remote units, measuring a received signal strength and/or an estimated data rate from each of a second plurality of remote units in the cloud not bonded to the communication session, and dynamically bonding one or several of the second plurality of remote units to the communication session if the measured received signal strength or the estimated data rate of the one of the second plurality of remote units is greater than the measured received signal strength or the data rate of one of the first plurality of remote units.

In accordance with exemplary embodiments disclosed herein, DCB can be employed in a dense (i.e., separated by several meters) grid of antennas to compensate for link loss variation due to the use of multi-mode optical fibers (MMFs) in the system. As discussed more fully below, DCB can equalize link loss for different optical fibers and mitigate fading effects. This can result in an increase in the coverage area with maximum bit rate in a radio-over-multi-mode-fiber picocellular system.

DCB can be performed continually and/or periodically to measure the signal strengths of remote units near to remote units involved in a Multiple Input/Multiple Output (MIMO) communication session. When it is determined that switching the operation of a remote unit currently utilized in a communication session to a nearby unutilized or underutilized remote unit not bonded to the communication session can result in greater signal strength or a faster data rate, the operation of the two remote units is dynamically swapped. This swapping is referred to herein as "dynamic cell bonding" or, more simply, "dynamic bonding." As a result of the dynamic bonding, the remote unit previously engaged in the MIMO communication session is subsequently unbonded from the MIMO communication session.

More specifically, in accordance with exemplary embodiments described below, a picocell infrastructure can be utilized to achieve wireless transmission gains by combining the separate single antennas (fed by single optical link) at remote units of neighboring cells by signal processing from a central location. Specifically, in a relatively dense grid of antennas, DCB can be utilized to compensate for the bandwidth limitations of MMFs. As discussed more fully below, a network based on low-bandwidth MMF with DCB has even slightly better coverage than a fixed-cell network where only the highest-bandwidth MMFs are used.

Before discussing exemplary embodiments of an MMF network employing DCB, FIGS. 2-5 are provided to discuss examples of an optical fiber-based wireless communication system which may employ the fiber optic array cables and other systems and methods described herein to enable wireless communication.

Figure 2:
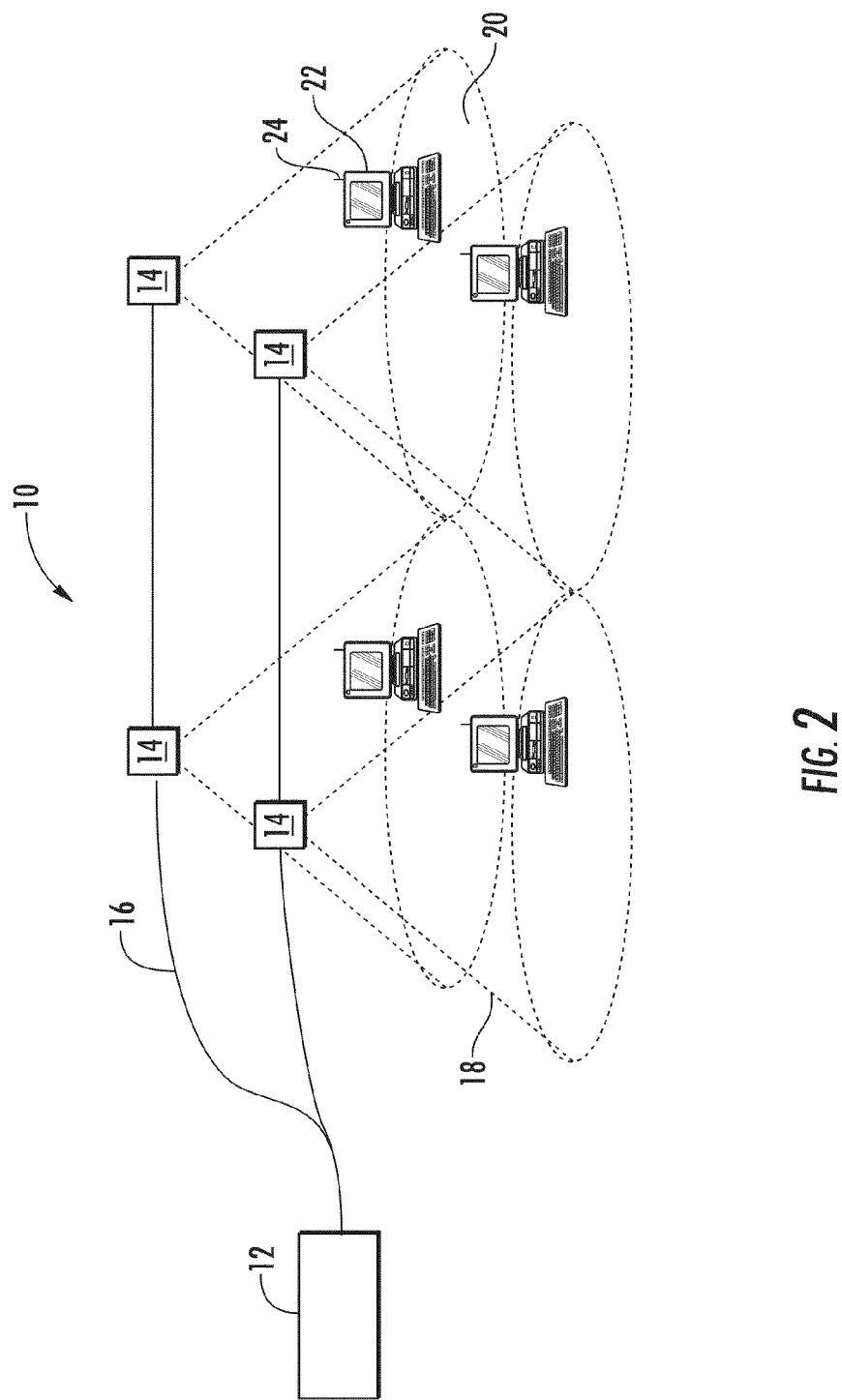
FIG. 2 is a schematic diagram of an exemplary generalized embodiment of an optical fiber-based wireless picocellular system.

FIG. 2 illustrates a schematic diagram of an exemplary embodiment of an optical fiber-based wireless picocellular system 10 employing MMF. The optical fiber-based wireless picocellular system 10 is also referred to herein as "system 10." The system 10 in this embodiment includes a head-end unit 12, a plurality of transponder units or remote antenna units 14, or simply "remote units 14." At least one optical fiber radio frequency (RF) communication link 16 optically couples the head-end unit 12 to each remote unit 14. The head-end unit 12 may be any type of controller or control system, or any other device or system that can control communications directed to and from the remote units 14, as described in more detail below. As also discussed in detail below, the system 10 facilitates the formation of a picocell 18 substantially centered about remote unit 14 and extending in a generally conical form away from an associated remote unit 14. The plurality of remote units 14 forms a picocellular coverage area 20. While illustrated as covering separate and distinct regions of space, picocellular coverage areas associated with different remote units may intersect and overlap. The head-end unit 12 is adapted to perform or to facilitate any one of a number of RoF applications, such as radio frequency identification (RFID), wireless local area network (WLAN) communication, or cellular phone service, as examples. Shown within the picocell 18 is a client device 22 in the form of a computer. The client device 22 may be any device capable of receiving and transmitting RF communications and signals. The client device 22 includes an antenna system 24 (e.g., a wireless card) adapted to receive and/or send electromagnetic RF signals.

Figure 3:
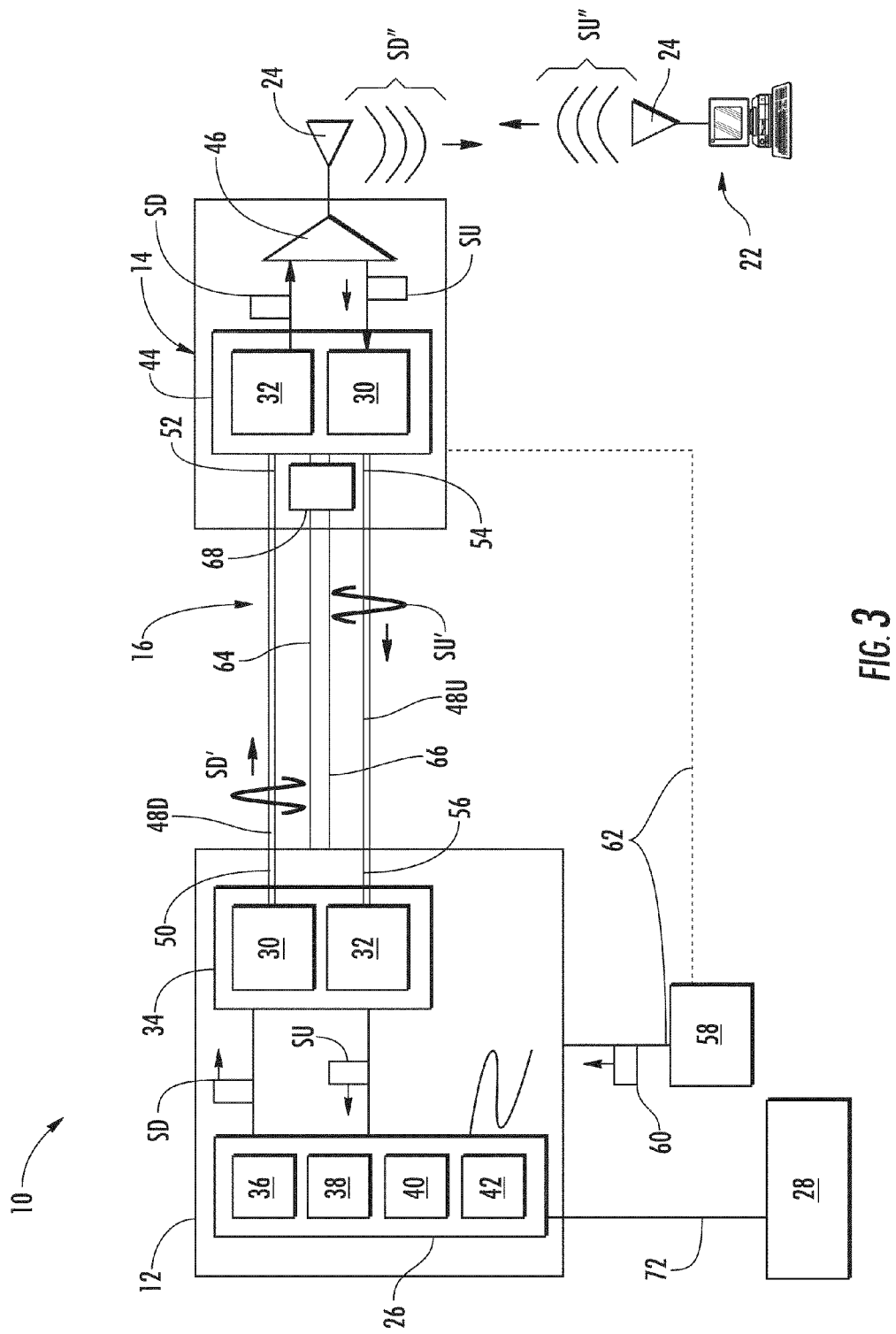
FIG. 3 is a more detailed schematic diagram of an exemplary embodiment of the system of FIG. 2.

FIG. 3 is a detailed schematic diagram of an exemplary embodiment of system 10 of FIG. 2. In an exemplary embodiment, the head-end unit 12 includes a service unit 26 that provides electrical RF service signals for a particular wireless service or application. In an exemplary embodiment, the service unit 26 provides electrical RF service signals by passing (or conditioning and then passing) such signals from one or more outside networks 28, as described below. In a particular example embodiment, this includes providing WLAN signal distribution as specified in the Institute of Electrical Engineers (IEEE) 802.11 standard, i.e., in the frequency range from 2.4 to 2.5 GigaHertz (GHz) and from 5.0 to 6.0 GHz. In another exemplary embodiment, the service unit 26 provides electrical RF service signals by generating the signals directly. In another exemplary embodiment, the service unit 26 coordinates the delivery of the electrical RF service signals between client devices within the picocellular coverage area 20.

The service unit 26 is electrically coupled to an electrical-to-optical (E/O) converter 30 that receives an electrical RF service signal from the service unit 26 and converts it to a corresponding optical signal, as discussed in greater detail below. In an exemplary embodiment, the E/O converter 30 includes a laser suitable for delivering sufficient dynamic range for the RoF applications described herein, and optionally includes a laser driver/amplifier electrically coupled to the laser. Examples of suitable lasers for the E/O converter 30 include, but are not limited to, laser diodes, distributed feedback (DFB) lasers, Fabry-Perot (FP) lasers, and vertical cavity surface emitting lasers (VCSELs).

The head-end unit 12 also includes an optical-to-electrical (O/E) converter 32 electrically coupled to the service unit 26. The O/E converter 32 receives an optical RF service signal and converts it to a corresponding electrical signal. In an example embodiment, the O/E converter 32 is a photodetector, or a photodetector electrically coupled to a linear amplifier. The E/O converter 30 and the O/E converter 32 constitute a "converter pair" 34.

In accordance with an exemplary embodiment, the service unit 26 includes an RF signal modulator/demodulator unit 36 for modulating/demodulating RF signals, a digital signal processing unit ("digital signal processor") 38, a central processing unit (CPU) 40 for processing data and otherwise performing logic and computing operations, and a memory unit 42 for storing data, such as data to be transmitted over a WLAN.

The remote unit 14 includes a converter pair 44, wherein the E/O converter 30 and the O/E converter 32 therein are electrically coupled to an antenna system 24 via an RF signal-directing element 46, such as a circulator. The signal-directing element 46 serves to direct the downlink and uplink electrical RF service signals, as discussed below. In accordance with an exemplary embodiment, the antenna system 24 includes one or more patch antennas, such as disclosed in U.S. patent application Ser. No. 11/504,999, filed Aug. 16, 2006 entitled "RADIO-OVER-FIBER TRANSPONDER WITH A DUAL-BAND PATCH ANTENNA SYSTEM," and U.S. patent application Ser. No. 11/451,553, filed Jun. 12, 2006 entitled "CENTRALIZED OPTICAL-FIBER-BASED WIRELESS PICOCELLULAR SYSTEMS AND METHODS," both of which are incorporated herein by reference in their entireties.

The optical fiber RF communication link 16 includes a downlink optical fiber 48D having a downlink optical fiber input end 50 and an output end 52, and an uplink optical fiber 48U having an uplink optical fiber input end 54 and an output end 56. The downlink and uplink optical fibers 48D and 48U optically couple the converter pair 34 at the head-end unit 12 to the converter pair 44 at the remote unit 14. Specifically, the downlink optical fiber input end 50 is optically coupled to the E/O converter 30 of the head-end unit 12, while the output end 52 is optically coupled to the O/E converter 32 at the remote unit 14. Similarly, the uplink optical fiber input end 54 is optically coupled to the E/O converter 30 of the remote unit 14, while the output end 56 is optically coupled to the O/E converter 32 at the head-end unit 12.

In accordance with an exemplary embodiment, the optical fiber-based wireless picocellular system 10 employs a known telecommunications wavelength, such as eight hundred fifty (850) nanometers (nm), one thousand three hundred (1300) nm, or one thousand five hundred fifty (1550) nm. In another exemplary embodiment, the system 10 employs other less common but suitable wavelengths such as nine hundred eighty (980) nm.

Exemplary embodiments of the system 10 include using multi-mode optical fiber for downlink and uplink optical fibers 48D and 48U. The particular type of optical fiber depends on the application of the system 10. For many in-building deployment applications, maximum transmission distances typically do not exceed three hundred (300) meters (m). The maximum length for the intended RoF transmission needs to be taken into account when considering using multi-mode optical fibers for the downlink and uplink optical fibers 48D and 48U. For example, it has been shown that a one thousand four hundred (1400) MHz/km multi-mode optical fiber bandwidth-distance product is sufficient for 5.2 GHz transmission up to three hundred (300) m.

In an exemplary embodiment, the system 10 employs fifty (50) μm multi-mode optical fiber (MMF) for the downlink and uplink optical fibers 48D and 48U, and E/O converters 30 that operate at eight hundred fifty (850) nm using commercially available VCSELs.

The system 10 also includes a power supply 58 that generates an electrical power signal 60. The power supply 58 is electrically coupled to the head-end unit 12 for powering the power-consuming elements therein. In an exemplary embodiment, an electrical power line 62 runs through the head-end unit 12 and over to the remote unit 14 to power the E/O converter 30 and the O/E converter 32 in the converter pair 44, the optional RF signal-directing element 46 (unless the RF signal-directing element 46 is a passive device such as a circulator), and any other power-consuming elements (not shown). In an exemplary embodiment, the electrical power line 62 includes two wires 64 and 66 that carry a single voltage and that are electrically coupled to a DC power converter 68 at the remote unit 14. The DC power converter 68 is electrically coupled to the E/O converter 30 and the O/E converter 32 in the converter pair 44, and changes the voltage or levels of the electrical power signal 60 to the power level(s) required by the power-consuming components in the remote unit 14. In an exemplary embodiment, the DC power converter 68 is either a DC/DC power converter, or an AC/DC power converter, depending on the type of electrical power signal 60 carried by the electrical power line 62. In an exemplary embodiment, the electrical power line 62 includes standard electrical-power-carrying electrical wire(s), e.g., 18-26 American Wire Gauge (AWG) used in standard telecommunications and other applications. In another example embodiment, the electrical power line 62 (dashed line) runs directly from the power supply 58 to the remote unit 14 rather than from or through the head-end unit 12. In another example embodiment, the electrical power line 62 includes more than two wires and carries multiple voltages.

In an example embodiment, the head-end unit 12 is operably coupled to one or more outside networks 28 via a network link 72.

With reference to the optical fiber-based wireless picocellular system 10 of FIGS. 2 and 3, the service unit 26 generates an electrical downlink RF service signal SD (also referred to herein as "electrical signal SD") corresponding to its particular application. In an exemplary embodiment, this is accomplished by the digital signal processor 38 providing the RF signal modulator/demodulator unit 36 with an electrical signal (not shown) that is modulated onto an RF carrier to generate a desired electrical signal SD.

The electrical signal SD is received by the E/O converter 30, which converts this electrical signal into a corresponding optical downlink RF signal SD' (also referred to herein as "optical signal SD'"), which is then coupled into the downlink optical fiber 48D at the downlink optical fiber input end 50. In an exemplary embodiment, the amount of power provided to antenna system 24 is varied to define the size of the associated picocell 18 (FIG. 2), which in example embodiments range anywhere from about a meter across to about twenty meters across.

The optical signal SD' travels over the downlink optical fiber 48D to the output end 52, where it is received by the O/E converter 32 in the remote unit 14. The O/E converter 32 converts the optical signal SD' back into the electrical signal SD, which then travels to the RF signal-directing element 46. The RF signal-directing element 46 then directs the electrical signal SD to the antenna system 24. The electrical signal SD is fed to the antenna system 24, causing it to radiate a corresponding electromagnetic downlink RF signal SD" (also referred to herein as "electromagnetic signal SD'").

Because the client device 22 is within the picocell 18, the electromagnetic signal SD" is received by the antenna system 24 of the client device 22, which may be part of a wireless card, or a cell phone antenna, for example. The antenna system 24 converts the electromagnetic signal SD" into an electrical signal SD in the client device 22 (the electrical signal SD is not shown therein). The client device 22 then processes the electrical signal SD, e.g., stores the signal information in memory, displays the information as an e-mail or text message, etc.

In an exemplary embodiment, the client device 22 generates an electrical uplink RF signal SU (not shown in the client device 22), which is converted into an electromagnetic uplink RF signal SU" (also referred to herein as "electromagnetic signal SU'") by the antenna system 24.

Because the client device 22 is located within the picocell 18, the electromagnetic signal SU" is detected by the antenna system 24 of the remote unit 14, which converts this signal back into the electrical signal SU. The electrical signal SU is directed by the RF signal-directing element 46 to the E/O converter 30, which converts this electrical signal SU into a corresponding optical uplink RF signal SU' (also referred to herein as "optical signal SU'"), which is then coupled into the uplink optical fiber input end 54 of the uplink optical fiber 48U. The optical signal SU' travels over the uplink optical fiber 48U to the output end 56, where it is received by the O/E converter 32 at the head-end unit 12. The O/E converter 32 converts the optical signal SU' back into the electrical signal SU, which is then directed to the service unit 26. The service unit 26 receives and processes the electrical signal SU, which in an example embodiment includes one or more of the following: storing the signal information, digitally processing or conditioning the signals, sending the signals on to one or more outside networks 28 via the network links 72, and sending the signals to one or more client devices 22 in the picocellular coverage area 20. In an example embodiment, the processing of the electrical signal SU includes demodulating the electrical signal SU in the RF signal modulator/demodulator unit 36, and then processing the demodulated signal in the digital signal processor 38.

Figure 4:
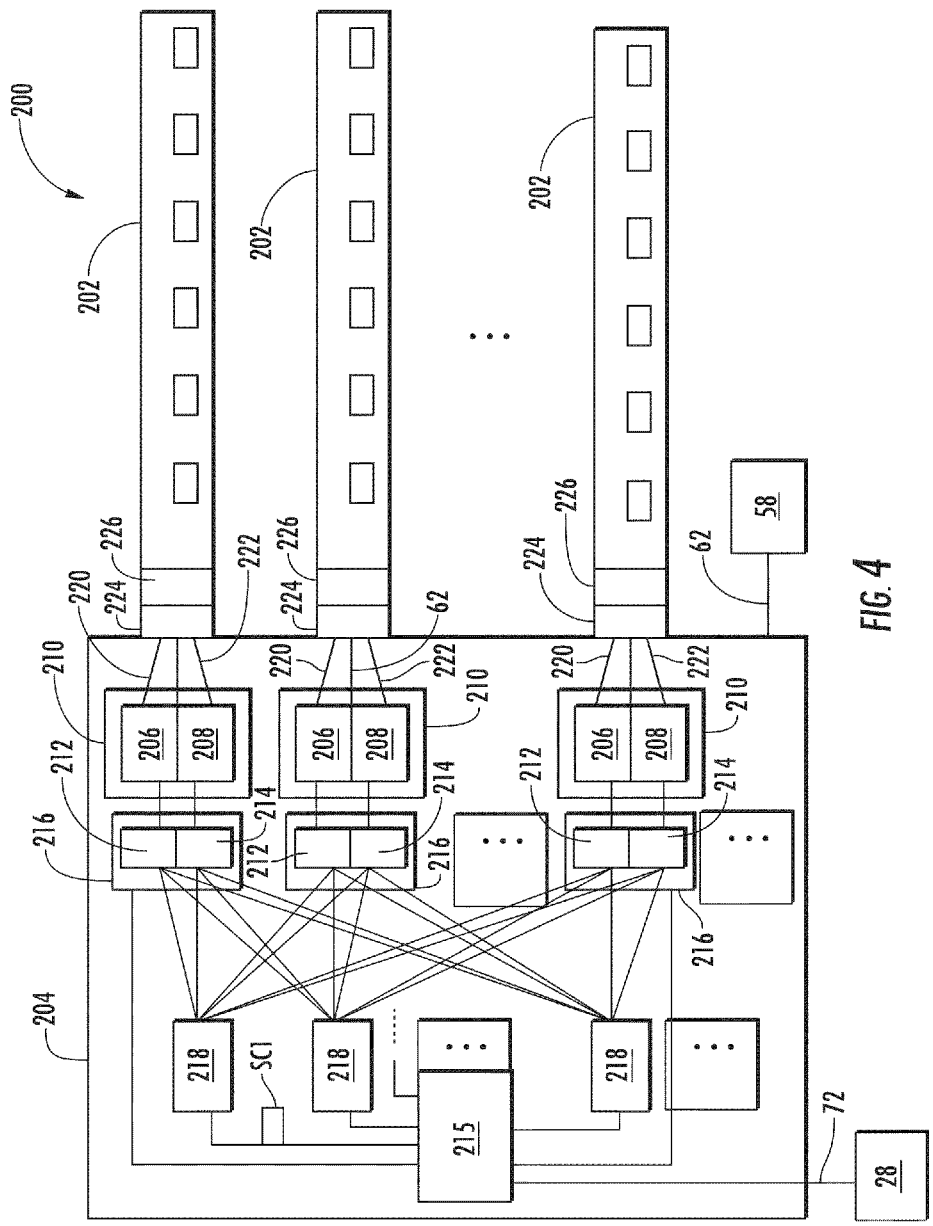
FIG. 4 is a schematic diagram of an exemplary embodiment of a centralized optical fiber-based wireless picocellular system that includes multiple optical fiber cables optically coupled to a central head-end unit.

FIG. 4 is a schematic diagram of an exemplary embodiment of an optical fiber-based wireless picocellular system 200 according the disclosure. The optical fiber-based wireless picocellular system 200 is also referred to herein as the "system 200." The system 200 is similar to the system 10 as described above and illustrated in FIGS. 2 and 3, but includes multiple optical fiber cables 202 optically coupled to a central head-end station 204. The central head-end station 204 includes a number of E/O converter arrays 206 and a corresponding number of O/E converter arrays 208, arranged in pairs in converter array units 210, with one converter array unit 210 optically coupled to one optical fiber cable 202. Likewise, the system 200 includes a number of downlink multiplexers 212 and uplink multiplexers 214, arranged in pairs in multiplexer units 216, with one multiplexer unit 216 electrically coupled to one converter array unit 210. In an exemplary embodiment, a controller 215 is electrically coupled to each multiplexer unit 216 and is adapted to control the operation of the downlink and uplink multiplexers 212 and 214 therein. Here, the term "array" is not intended to be limited to components integrated onto a single chip as is often done in the art, but includes an arrangement of discrete, non-integrated components.

While described above with reference to the operation of a single remote unit 14, in accordance with exemplary embodiments disclosed below, remote units 14 are grouped into clouds of remote units 14 for use in DCB. As used herein, a "cloud" refers to a set comprising all remote units 14 each associated with one another in such a way that each may be counted when determining the number of nodes (NumNodes) available for the purposes of performing DCB. As described more fully below, a cloud may be further defined, for example, as the set of all remote units 14 physically linked to the same access point. For example, a plurality of remote units 14 forming a cloud may be used in combination with diversity antennas on client devices 22 (FIG. 2) to provide a Multiple-Input/Multiple-Output (MIMO) configuration. MIMO is the use of multiple antennas at both the transmitter and receiver to improve communication performance to maximize the performance of a system, such as the system 200. Such an arrangement can be used to achieve an increased bit rate at the same antenna power level. It achieves this by employing higher spectral efficiency (more bits per second per hertz of bandwidth) and link reliability or diversity (reduced fading).

Each E/O converter array 206 is electrically coupled to the downlink multiplexer 212 in the corresponding multiplexer unit 216. Likewise, each O/E converter array 208 is electrically coupled to the uplink multiplexer 214 in the corresponding multiplexer unit 216. Service units 218 are each electrically coupled to both the downlink and uplink multiplexers 212 and 214 within each multiplexer unit 216. Respective downlink and uplink optical fiber cables 220 and 222 optically couple each converter array unit 210 to a corresponding optical fiber cable 202. In an example embodiment, the central head-end station 204 includes connector ports 224 and optical fiber cables 202 include connectors 226 adapted to connect to the connector ports 224. In an exemplary embodiment, the connectors 226 are Mechanical Transfer (MT) connectors, such as the UNICAMT™ MTP connector available from Corning Cable Systems LLC, Hickory, N.C. In an example embodiment, the connectors 226 are adapted to accommodate the electrical power line 62 connected to the connector port 224.

Figure 5:
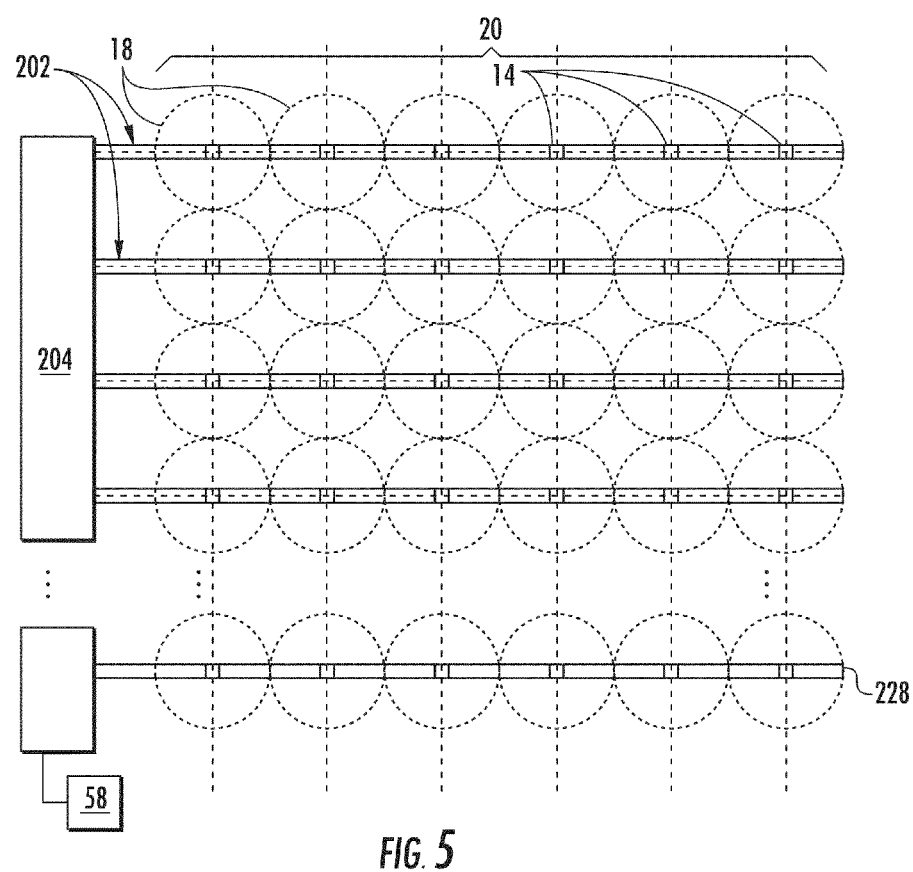
FIG. 5 is a "top down" view of the system of FIG. 4, showing an exemplary extended picocellular coverage area formed by using multiple optical fiber cables.

FIG. 5 is an illustration of a "top down" view of the system 200, showing an extended picocellular coverage area 20 formed by using multiple optical fiber cables 202 as might, for example, be spread across a floor of a building or other structure in a generally planar manner. A grid 228 is superimposed over the resultant array of remote units 14. In the exemplary embodiment shown, the remote unit 14 is located at each intersection of every two generally orthogonal grid lines to form a regularly distributed array of the remote units 14. In an example embodiment, the system 200 supports anywhere from two remote units 14 to hundreds of remote units 14, to even thousands of remote units 14. The particular number of remote units 14 employed is not fundamentally limited by the design of the system 200, but rather by the particular application.

The system 200 operates in a manner similar to the system 10 as described above, except that instead of the remote units 14 being disposed in a single optical fiber cable 202, they are distributed over two or more optical fiber cables 202 through the use of corresponding two or more converter array units 210. The electrical signals SD from the service units 218 are distributed to each multiplexer unit 216. The downlink multiplexers 212 therein convey electrical signals SD to one, some, or all of the converter array units 210, depending on which remote units 14 are to be addressed by which service unit 218. The electrical signals SD are then processed as described above, with the downlink optical signals SD' being sent to one, some, or all of remote units 14. The uplink optical signals SU' generated by the client devices 22 in the corresponding picocells 18 return to the corresponding converter array units 210 at the central head-end station 204. The optical signals SU' are converted to electrical signals SU at the receiving converter array unit(s) 210 and are then sent to the uplink multiplexers 214 in the corresponding multiplexer unit(s) 216. The uplink multiplexers 214 therein are adapted (e.g., programmed by the controller 215) to direct the electrical signals SU to the service unit(s) 218 that require(s) receiving electrical signals SU. The receiving service units 218 process the electrical signals SU, which as discussed above in an exemplary embodiment includes one or more of: storing the signal information; digitally processing or conditioning the signals; sending the signals on to the one or more outside networks 28 via the network links 72; and sending the signals to one or more client devices 22 in the picocellular coverage area 20.

Figure 6A:
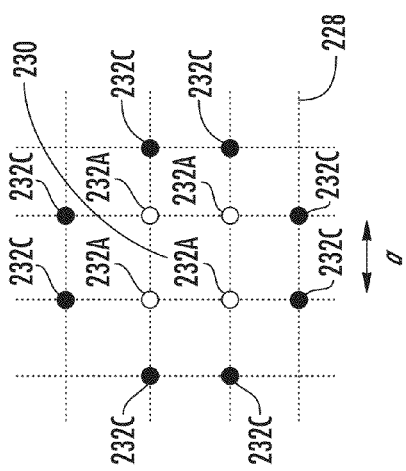
FIGS. 6A-6C are diagrams illustrating exemplary signal strength and bit rate within an exemplary square elementary cell.
Figure 6C:
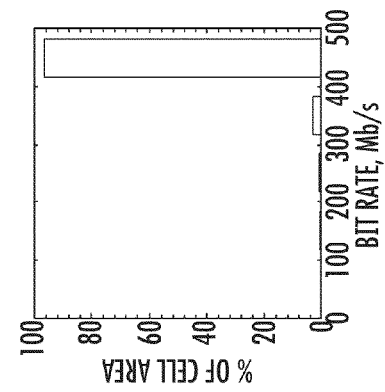
Figure 6B:
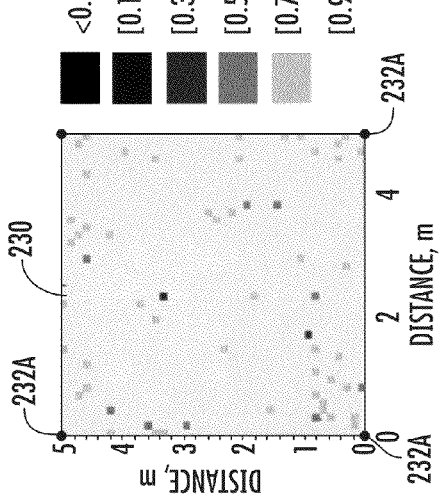

FIGS. 6-8 discussed below are provided in order to illustrate examples of implementing DCB in a MIMO communication session. In this regard, FIGS. 6A-6C are illustrations of exemplary disparaging that can occur in maximum bit rates achievable by the client device 22 of the system 200 operating within one or more picocells bounded by four remote units 14 forming a square elementary cell 230, as an example. With reference to FIG. 6A, the grid 228 corresponds to the grid 228 of FIG. 5. At each intersection of grid lines is a node 232 corresponding to the position of a remote unit 14. As used herein, references to a "node 232" may be used interchangeably with references to the "remote unit 14" associated with the node 232. For purposes of explanation, nodes 232 active in a communication session are designated as "node 232A." More specifically, nodes 232 initially active in a MIMO communication session prior to the performance of DCB as described in accordance with reference to exemplary embodiments described herein are referred to as "node 232A" (see FIG. 9). Nodes 232 not bonded to a communication session but included in a cloud that includes nodes that are bonded to the communication session are referred to as "node 232C." Returning to FIG. 6A, the four nodes 232A active in a communication session forming the square elementary cell 230 are surrounded by other adjacent nodes 232C. The eight adjacent nodes 232C are candidate nodes that can be utilized in a DCB scenario. In the simulation illustrated in FIG. 6A, each square elementary cell 230 has an a=five (5) meter (m) period.

FIG. 6B is an illustration showing the maximum bit rate achievable by a client device 22 within an exemplary square elementary cell 230 of a 4×4 MIMO system. In this example, the square elementary cell 230 has a period of a=5 m. There is assumed a path loss exponent of 4.0 and a shadow fading parameter of 3.5 dB. It is further assumed that each client device antenna system 24 is omnidirectional. Gaussian distribution for the fiber loss is assumed with σ=3 dB. Lastly, it is assumed that each MMF utilized to communicate with each remote unit 14 at each node 232A is a 62.5 μm fiber and is selected to be in the top 5% of bandwidth compared to other MMFs having the same characteristics. It is evident that, when utilizing the top five percent (5%) of MMFs from a random distribution of MMFs, up to approximately ninety four percent (94%) of the square elementary cell 230 is covered at the maximum bit rate. This result is further illustrated in FIG. 6C where there is plotted the percentage of the cell area coverage (% of cell area) for each bit rate (bit rate, Mb/s).

Figure 7B:
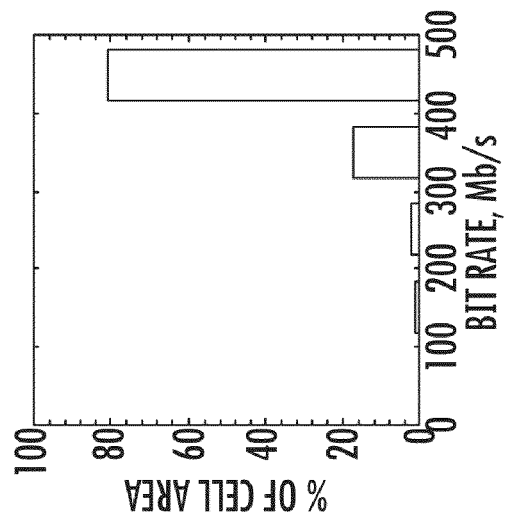
FIGS. 7A and 7B are diagrams illustrating exemplary signal strength and bit rate within an exemplary square elementary cell.
Figure 7A:
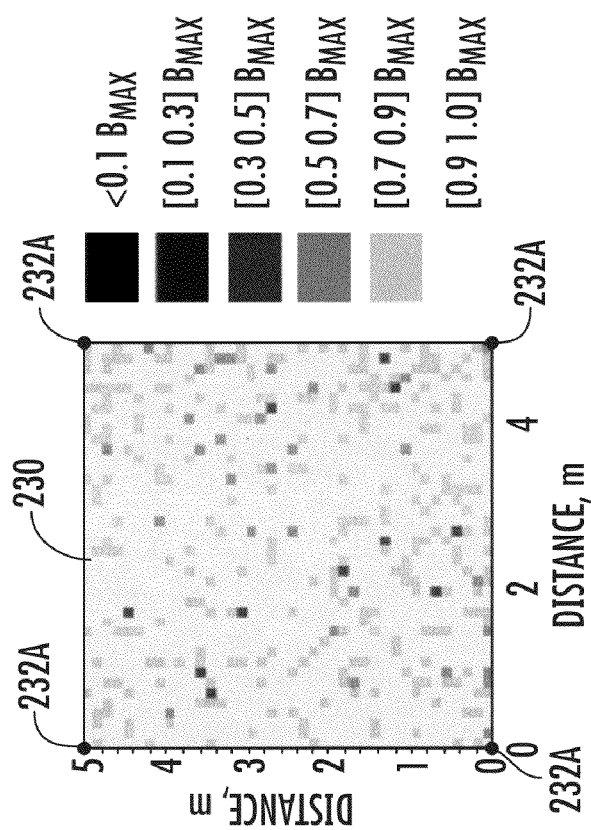

FIGS. 7A and 7B illustrate the percentage of coverage at varying bit rates for a square elementary cell 230 having the same dimensions and operating with the same parameters as in FIG. 6B with one exception. Specifically, in this example, each MMF utilized to communicate with each remote unit 14 at each node 232A is randomly selected so as to mirror the distribution of characteristics across all MMFs of the same or similar type. As a result, the MMFs utilized in the present example have a lower-bandwidth on average than do those utilized with reference to FIGS. 6B and 6C. The resulting increased variability in the quality of individual MMFs thus selected is reflected in the decreased percentage of the cell area covered at the maximum bit rate. Specifically, as seen in FIGS. 7A and 7B, the cell area covered at the maximum bit rate drops considerably to less than 80%. Note that in the exemplary embodiments of FIGS. 6A, 6B, 7A, and 7B, the same four (4) nodes 232A bonding the square elementary cell 230 are utilized as bonded to an RoF communication session.

In an exemplary embodiment in accordance with the disclosure, DCB is utilized to increase the percentage of a cell area covered at the maximum bit rate. In accordance with the simulated results illustrated in FIGS. 8A and 8B, it is possible to achieve results superior to those illustrated in FIGS. 6B and 6C even while utilizing the MMFs employed in FIGS. 7A and 7B. As described more fully below, DCB is employed to expand the set of nodes 232 that may be utilized in, for example, the 4×4 MIMO situation illustrated in FIG. 6A. Specifically, instead of merely using remote units 14 associated with the four nodes 232A forming the square elementary cell 230, each of the remote units 14 associated with the eight adjacent nodes 232C may be dynamically swapped, or "bonded", with one of the four nodes 232A when it is determined that doing so would increase the percentage of the square elementary cell 230 within which the maximum bit rate can be achieved. As described more fully below, in an exemplary embodiment, this determination is made based, in part, upon which remote units 14 associated with nodes 232 belonging to the cloud of nodes 232 including adjacent nodes 232C exhibit the best signal-to-interference (S/I) and S/N ratios.

With continued reference to FIG. 8A, there is illustrated the cell area coverage using a random distribution of MMFs (as in FIGS. 7A and 7B) but employing DCB. The results are illustrated in FIGS. 8A and 8B, where it is demonstrated that the performance of the system when DCB is employed increases such that nearly one hundred percent (100%) of the square elementary cell 230 enjoys a maximum bit rate.

Figure 9:
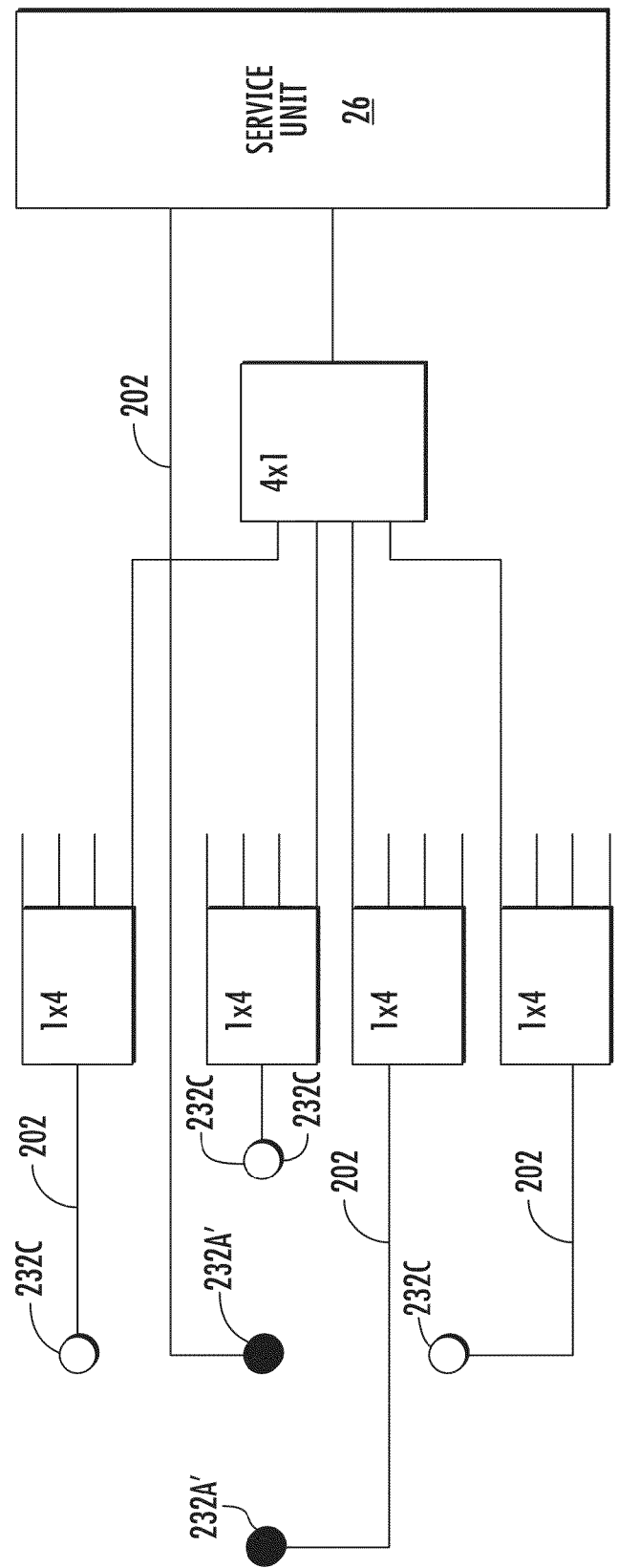
FIG. 9 is an illustration of a hardware configuration for practicing a two-by-two (2×2) Multiple Input/Multiple Output (MIMO) communication processing scheme in accordance with exemplary embodiments described herein.

An exemplary embodiment of a method by which DCB can be performed in accordance with the disclosure is described with reference to FIG. 9 and the flowchart of FIG. 10. With reference to FIG. 9, there is illustrated a hardware configuration for a 2×2 MIMO scenario engaged in a communication session with, for example, a client device 22 (not shown), whereby multiple antenna systems 24 each at one of a number of remote units 14 and a corresponding number of antennas at the client device 22 engage in a communication session. In the exemplary illustrated configuration in FIG. 9, the system 200 (FIG. 4) operates to select two (2) of the five (5) nodes 232 each associated with a remote unit 14 exhibiting, for example, the highest measured received signal strength and/or data rate. In exemplary embodiments, all of the nodes 232 are presumed to be distributed in a generally planar manner such as across a floor of a building.

Figure 10:
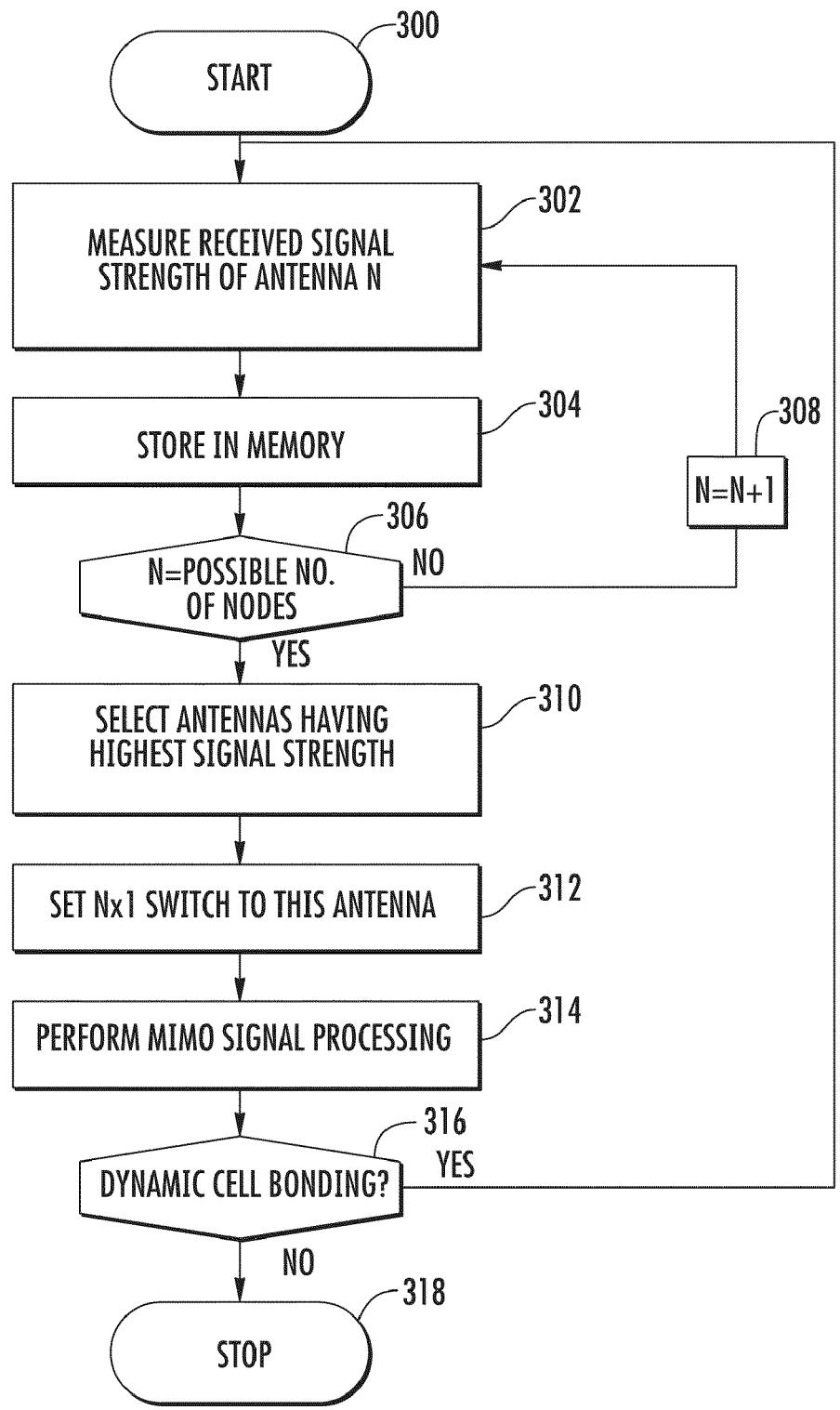
FIG. 10 is a flowchart of DCB in accordance with exemplary embodiments described herein.

In this example, as illustrated in FIG. 10, the process of DCB begins with a first node 232A' already selected, though in practice it need not be (block 300). As illustrated, node 232A', located at center, is hardwired to service unit 26 and remains in a selected state throughout DCB. Next, beginning at N=1, the signal strength at each remote unit 14 corresponding to each of the four (4) other nodes is measured. Note that, in this example, the number of possible nodes from which to chose when performing DCB is five (5). As the node 232A', located at center, is always selected, there remain four (4) possible other nodes 232 that can be utilized. Node 232A', at center, is darkened to indicate that it is selected. As a result, the total possible number of nodes (NumNodes) in the present example is four (4) (total number of nodes (5)−number of nodes always activated (1)=4). The process proceeds to measure the signal strength of each of the remaining four (4) nodes 232. To achieve these measurements, a computing device, such as the CPU 40, queries the received signal strength from a client device 22 via the remote unit 14 corresponding to N=1 (block 302). The CPU 40 stores the measured signal strength corresponding to N=1 in memory, such as in memory unit 42 (block 304).

Next, a check is performed to see if N=NumNodes (block 306). As noted above, in the present example, NumNodes=4. As a result the comparison of N, having a value of "1," does not equal NumNodes (equal to "4"). As a result, N is increased by one (block 308) and the process of measuring the signal strength of the other nonmeasured nodes continues once again (block 302). After three more iterations, it will be determined that N is equal to NumNodes.

Next, processing continues to select those remote units 14 corresponding to measured nodes, numbering NumNodes in total, having the highest signal strength (block 310). Because the present example is a 2×2 MIMO configuration in which only two nodes are utilized at any one time and, further, because the node 232A', located at center, is always selected, this block requires that only the remote unit 14 corresponding to the node with the single highest associated value be selected. In the present example, the node 232A' selected is the node directly to the left of center node 232A'. As a result, the CPU 40 instructs the 4×1 switch receiving an input signal from the service unit 26 to direct or otherwise transmit the signal to the node 232A' at left of center (block 312). As a result, in the present example, the nodes 232C remain as adjacent, unutilized and unbonded nodes.

Next, MIMO signal processing is performed (block 314). During MIMO signal processing, data is transmitted to and received from the client device 22 via the selected remote units 14 having the highest measured signal strength.

Note that thus far there has been described only the first iteration of blocks by which the first number of remote units 14 are selected for use in MIMO processing (block 300 to block 314). After the initial selection of nodes is performed, a decision to perform dynamic cell bonding is made (block 316). Dynamic cell bonding is the process by which the nodes utilized in MIMO communication (e.g., two (2) nodes in 2×2 MIMO processing, four (4) nodes in 4×4 MIMO processing, etc.) are periodically, in a dynamic fashion, reassessed to determine the optimal configuration and utilization of the nodes. In the present example, if a determination is made to perform DCB, the process continues to block 302. As described above, the received signal strengths of all four (4) nodes (not including the central node 232A') are again measured and, if necessary, a node 232C is chosen to replace the operation of node 232A'. This newly selected node 232C is then dynamically bonded with the communication session to become an active node 232A' while, in approximate synchronicity, the formerly activated node 232A' is unbounded from the communication session. If a decision is made to forgo DCB, the process terminates (block 316).

In an alternative exemplary and non-limiting embodiment, a data rate of a remote unit 14 can be used in addition to or in lieu of antenna signal strength in FIG. 10. In this regard, the data rate of remote units 14 proximate to the selected center node 232A' can be used to provide a MIMO configuration and to determine dynamic cell bonding in FIG. 10. Data rate is another measure of the performance of a remote unit 14. Thus, in the embodiment of FIG. 10, the remote units 14 totaling NumNodes with the highest data rates can be used to provide the active nodes 232A for the MIMO configuration (blocks 302-312 in FIG. 10). Further, the data rate of nodes 232A selected for the MIMO configuration in FIG. 10 can also be used to determine communication performance and thus if an active node 232A should be selected for release in a dynamically bonded communication session. In this regard, the processing at block 316 in FIG. 10 can use the measured data rates of the active nodes 232A to reassess whether any of the active nodes 232A should be replaced with unbounded nodes 232C. In this regard, the measured estimated data rate (s) of nodes 232C, i.e., estimated based on the measured signal strength of nodes 232C, is compared with the data rate(s) of active nodes 232A. An estimated data rate is used to determine the performance of unbounded nodes 232C, because unbounded nodes 232C are not part of the communication session in this embodiment. As used herein, reference to "measured estimated data rate" refers to the process of determining an estimated data rate for an unbonded node 232C. If the estimated data rate(s) of unbonded nodes 232C are greater than the data rate(s) of active nodes 232A, as previously described above, such unbonded node(s) 232C can be chosen to replace the operation of active node(s) 232A and be dynamically bonded with the communication session to become an active node 232A (block 316 in FIG. 10).

Figure 11:
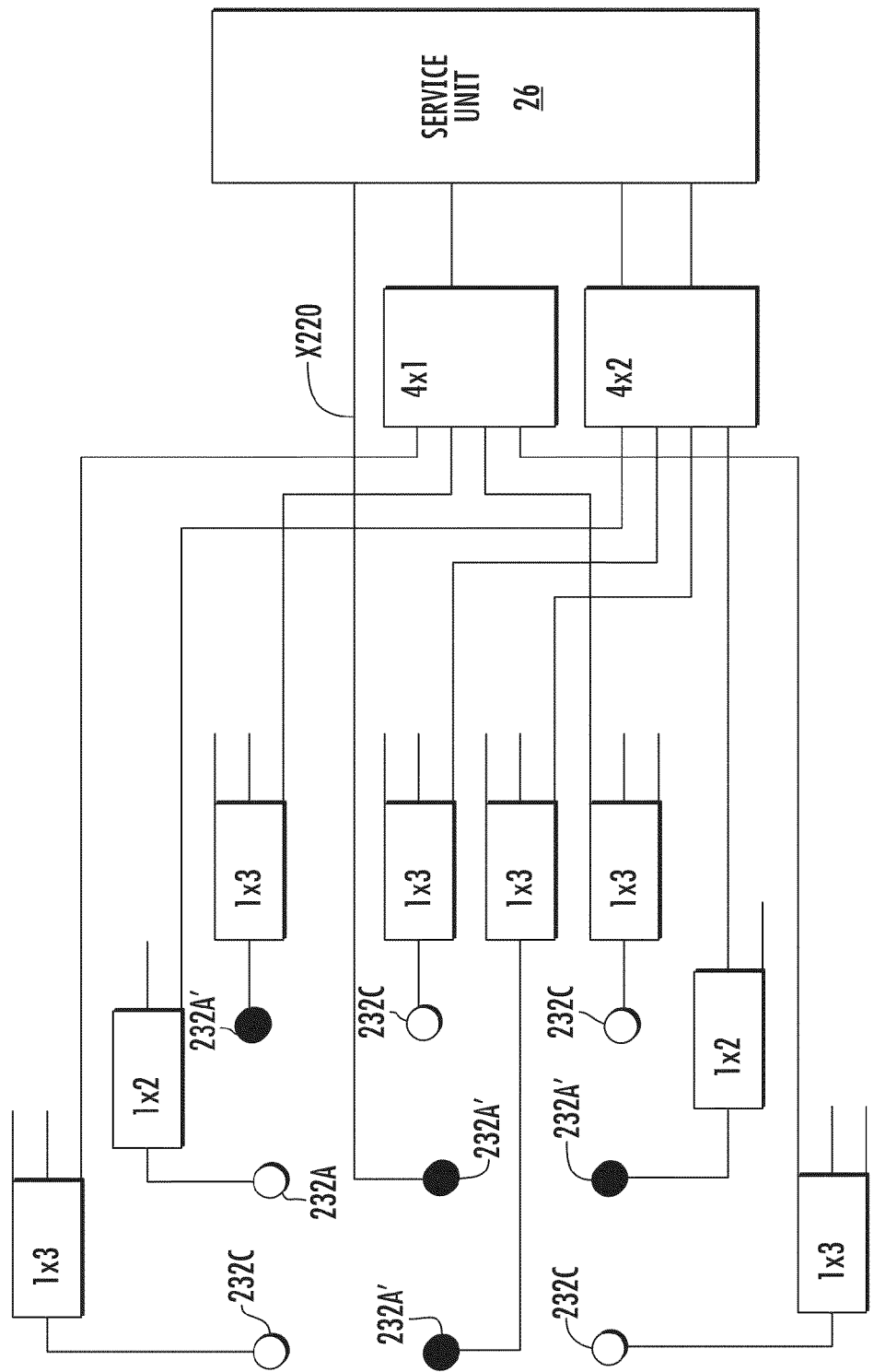
FIG. 11 is an illustration of a hardware configuration for practicing a four-by-four (4×4) MIMO communication processing scheme in accordance with exemplary embodiments described herein.

FIG. 11 is an illustration of a hardware configuration for a 4×4 MIMO scenario. In the exemplary illustrated configuration, the system 200 (FIG. 4) operates to select four (4) of the best nine (9) nodes each associated with a remote unit 14. Note that, in the example, four nodes 232A' have been initially chosen as exhibiting the highest signal strength. Once again, the node 232A', located at center, is always activated so that the total number of nodes available for DCB (NumNodes) is equal to eight (8). Thus, when DCB is performed, N will cycle from one (1) to eight (8) as the signal strength of each node is measured.

The rapidity with which DCB occurs may vary. DCB may be configured to be performed at time intervals ranging from hours to minutes to seconds and even to subsecond intervals. When utilizing MMF at high bandwidths, the transmission quality of the fiber is unstable. In addition, the position of the client device 22 can move thus altering the remote units 14 being utilized for MIMO communication. Further, the temperature of the lasers used and the state of the physical couplings along a MMF can both change over time. As a result, it is beneficial to periodically perform DCB as described in accordance with exemplary embodiments herein.

In addition, the flowchart of FIG. 10 describes the process of DCB for a single client device 22. In practice, it is likely that DCB will be performed in serial fashion for each client device 22 engaged in MIMO communication via the system 200. It is therefore evident that the amount of time required to perform DCB on a plurality of client devices 22 is dependent upon, at least, the number of client devices 22 and the number of nodes (NumNodes) at which a signal strength must be measured. As a result, the degree of periodicity of DCB may be bounded, in part, by factors including, but not limited to, the number of client devices 22 and the number of nodes (NumNodes) at which a signal strength must be measured.

As noted above, a "cloud" refers to a set comprising all remote units 14 each associated with one another in such a way that each may be counted when determining NumNodes for the purposes of performing DCB. In the exemplary embodiments described above with reference to FIGS. 9 and 11, the cloud is defined by the specific nodes physically connected to the service unit 26. Specifically, all nodes physically connected to a single service unit are deemed to be in the same cloud. In other exemplary embodiments, clouds may be defined logically, such as when based upon geographic proximity. In such instances, when nodes are regularly distributed across, for example, floors of a building, nodes which reside on adjacent floors but which are otherwise aligned vertically may be included in the same cloud. In another exemplary embodiment, for any given first node, all other nodes belonging to the same cloud as the first node may be defined as being within the line of sight from the first node where line of sight distance d can be found from the following equation:

$$P_{TX} + 20\log_{10}\frac{c}{4\pi f d_0} + 10n\log_{10}\frac{d_0}{d} = P_{noise}$$

where $P_{TX}$ is the transmitter antenna power in dBm, $P_{noise}$ is the thermal noise power (equals −92 dBm for the bandwidth of 16.6 GHz), c is the speed of light, f is the operation radio frequency (e.g. 2.4 or 5.2 GHz), n is the path loss exponent determined experimentally and $d_0$ is a reference distance outside of the Fraunhofer region of the antenna. Typically, $d_0$=1 m is assumed.

Regardless of the manner in which one or more clouds are defined, each cloud and a unique identifier of each remote unit included in the cloud must be determined and recorded. In an exemplary embodiment, a configuration is performed during which information regarding each cloud and a unique identifier of each remote unit included in the cloud is stored, for example, in memory unit 42 and available to CPU 40.

As used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Bend resistant multimode optical fibers may comprise a graded-index core region and a cladding region surrounding and directly adjacent to the core region, the cladding region comprising a depressed-index annular portion comprising a depressed relative refractive index relative to another portion of the cladding. The depressed-index annular portion of the cladding is preferably spaced apart from the core. Preferably, the refractive index profile of the core has a parabolic or substantially curved shape. The depressed-index annular portion may, for example, comprise a) glass comprising a plurality of voids, or b) glass doped with one or more down-dopants such as fluorine, boron, individually or mixtures thereof. The depressed-index annular portion may have a refractive index delta less than about −0.2% and a width of at least about 1 micron, said depressed-index annular portion being spaced from said core by at least about 0.5 microns.

In some embodiments that comprise a cladding with voids, the voids in some preferred embodiments are non-periodically located within the depressed-index annular portion. By "non-periodically located" we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match for each such cross section. That is, the voids are non-periodic, i.e., they are not periodically disposed within the fiber structure. These voids are stretched (elongated) along the length (i.e. generally parallel to the longitudinal axis) of the optical fiber, but do not extend the entire length of the entire fiber for typical lengths of transmission fiber. It is believed that the voids extend along the length of the fiber a distance less than about 20 meters, more preferably less than about 10 meters, even more preferably less than about 5 meters, and in some embodiments less than 1 meter.

The multimode optical fiber disclosed herein exhibits very low bend induced attenuation, in particular very low macrobending induced attenuation. In some embodiments, high bandwidth is provided by low maximum relative refractive index in the core, and low bend losses are also provided. Consequently, the multimode optical fiber may comprise a graded index glass core; and an inner cladding surrounding and in contact with the core, and a second cladding comprising a depressed-index annular portion surrounding the inner cladding, said depressed-index annular portion having a refractive index delta less than about −0.2% and a width of at least 1 micron, wherein the width of said inner cladding is at least about 0.5 microns and the fiber further exhibits a 1 turn, 10 mm diameter mandrel wrap attenuation increase of less than or equal to about 0.4 dB/turn at 850 nm, a numerical aperture of greater than 0.14, more preferably greater than 0.17, even more preferably greater than 0.18, and most preferably greater than 0.185, and an overfilled bandwidth greater than 1.5 GHz-km at 850 nm.

50 micron diameter core multimode fibers can be made which provide (a) an overfilled (OFL) bandwidth of greater than 1.5 GHz-km, more preferably greater than 2.0 GHz-km, even more preferably greater than 3.0 GHz-km, and most preferably greater than 4.0 GHz-km at an 850 nm wavelength. These high bandwidths can be achieved while still maintaining a 1 turn, 10 mm diameter mandrel wrap attenuation increase at an 850 nm wavelength of less than 0.5 dB, more preferably less than 0.3 dB, even more preferably less than 0.2 dB, and most preferably less than 0.15 dB. These high bandwidths can also be achieved while also maintaining a 1 turn, 20 mm diameter mandrel wrap attenuation increase at an 850 nm wavelength of less than 0.2 dB, more preferably less than 0.1 dB, and most preferably less than 0.05 dB, and a 1 turn, 15 mm diameter mandrel wrap attenuation increase at an 850 nm wavelength, of less than 0.2 dB, preferably less than 0.1 dB, and more preferably less than 0.05 dB. Such fibers are further capable of providing a numerical aperture (NA) greater than 0.17, more preferably greater than 0.18, and most preferably greater than 0.185. Such fibers are further simultaneously capable of exhibiting an OFL bandwidth at 1300 nm which is greater than about 500 MHz-km, more preferably greater than about 600 MHz-km, even more preferably greater than about 700 MHz-km. Such fibers are further simultaneously capable of exhibiting minimum calculated effective modal bandwidth (Min EMBc) bandwidth of greater than about 1.5 MHz-km, more preferably greater than about 1.8 MHz-km and most preferably greater than about 2.0 MHz-km at 850 nm.

Preferably, the multimode optical fiber disclosed herein exhibits a spectral attenuation of less than 3 dB/km at 850 nm, preferably less than 2.5 dB/km at 850 nm, even more preferably less than 2.4 dB/km at 850 nm and still more preferably less than 2.3 dB/km at 850 nm. Preferably, the multimode optical fiber disclosed herein exhibits a spectral attenuation of less than 1.0 dB/km at 1300 nm, preferably less than 0.8 dB/km at 1300 nm, even more preferably less than 0.6 dB/km at 1300 nm.

In some embodiments, the numerical aperture ("NA") of the optical fiber is preferably less than 0.23 and greater than 0.17, more preferably greater than 0.18, and most preferably less than 0.215 and greater than 0.185.

In some embodiments, the core extends radially outwardly from the centerline to a radius R1, wherein $10 \leq R1 \leq 40$ microns, more preferably $20 \leq R1 \leq 40$ microns. In some embodiments, $22 \leq R1 \leq 34$ microns. In some preferred embodiments, the outer radius of the core is between about 22 to 28 microns. In some other preferred embodiments, the outer radius of the core is between about 28 to 34 microns.

In some embodiments, the core has a maximum relative refractive index, less than or equal to 1.2% and greater than 0.5%, more preferably greater than 0.8%. In other embodiments, the core has a maximum relative refractive index, less than or equal to 1.1% and greater than 0.9%.

In some embodiments, the optical fiber exhibits a 1 turn, 10 mm diameter mandrel attenuation increase of no more than 1.0 dB, preferably no more than 0.6 dB, more preferably no more than 0.4 dB, even more preferably no more than 0.2 dB, and still more preferably no more than 0.1 dB, at all wavelengths between 800 and 1400 nm.

Figure 12:
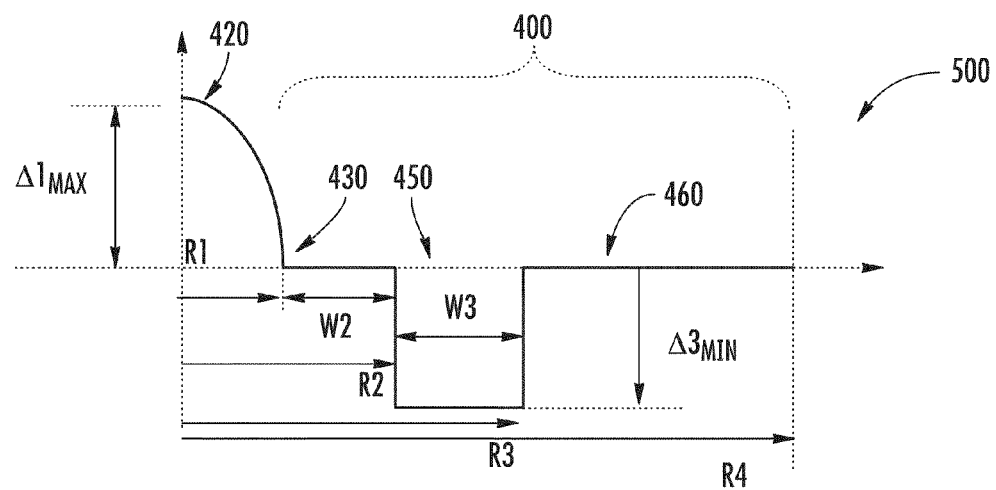
FIG. 12 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 13:
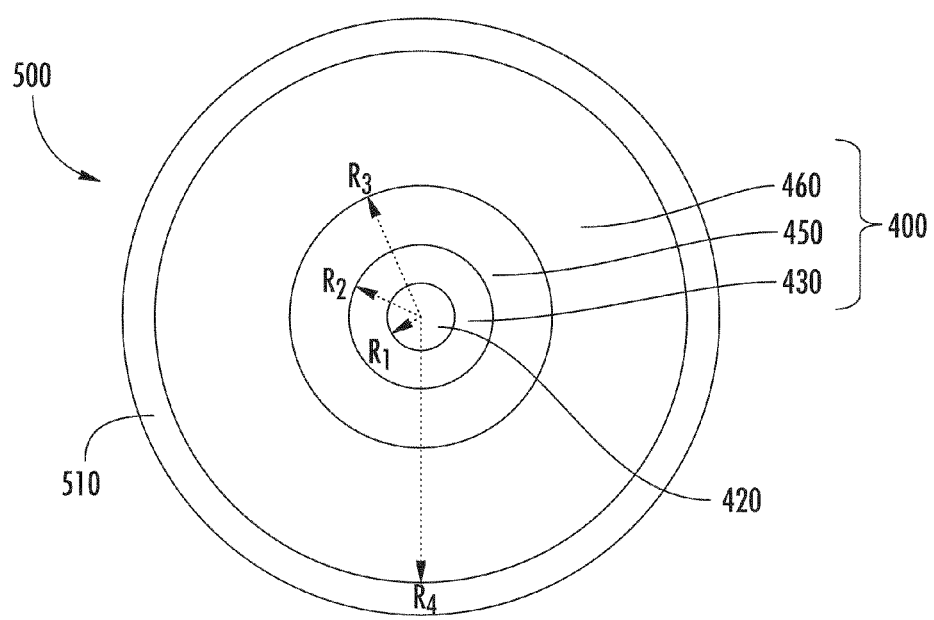
FIG. 13 is a schematic representation (not to scale) of a cross-sectional view of the optical waveguide fiber of FIG. 12.

FIG. 12 shows a schematic representation of the refractive index profile of a cross-section of the glass portion of an embodiment of a multimode optical fiber 500 comprising a glass core 420 and a glass cladding 400, the cladding comprising an inner annular portion 430, a depressed-index annular portion 450, and an outer annular portion 460. FIG. 13 is a schematic representation (not to scale) of a cross-sectional view of the optical waveguide fiber of FIG. 12. The core 420 has outer radius R1 and maximum refractive index delta $\Delta$1MAX. The inner annular portion 430 has width W2 and outer radius R2. Depressed-index annular portion 450 has minimum refractive index delta percent $\Delta$3MIN, width W3 and outer radius R3. The depressed-index annular portion 450 is shown offset, or spaced away, from the core 420 by the inner annular portion 430. The annular portion 450 surrounds and contacts the inner annular portion 430. The outer annular portion 460 surrounds and contacts the annular portion 450. The clad layer 400 is surrounded by at least one coating 510, which may in some embodiments comprise a low modulus primary coating and a high modulus secondary coating.

The inner annular portion 430 has a refractive index profile $\Delta2(r)$ with a maximum relative refractive index $\Delta$2MAX, and a minimum relative refractive index $\Delta$2MIN, where in some embodiments $\Delta$2MAX=$\Delta$2MIN. The depressed-index annular portion 450 has a refractive index profile $\Delta3(r)$ with a minimum relative refractive index $\Delta$3MIN. The outer annular portion 460 has a refractive index profile $\Delta4(r)$ with a maximum relative refractive index $\Delta$4MAX, and a minimum relative refractive index $\Delta$4MIN, where in some embodiments $\Delta$4MAX=$\Delta$4MIN. Preferably, $\Delta$1MAX>$\Delta$2MAX>$\Delta$3MIN. In some embodiments, the inner annular portion 430 has a substantially constant refractive index profile, as shown in FIG. 12 with a constant $42(r)$; in some of these embodiments, $\Delta2(r)$=0%. In some embodiments, the outer annular portion 460 has a substantially constant refractive index profile, as shown in FIG. 12 with a constant $\Delta4(r)$; in some of these embodiments, $\Delta4(r)$=0%. The core 420 has an entirely positive refractive index profile, where $\Delta1(r)$>0%. R1 is defined as the radius at which the refractive index delta of the core first reaches value of 0.05%, going radially outwardly from the centerline. Preferably, the core 420 contains substantially no fluorine, and more preferably the core 420 contains no fluorine. In some embodiments, the inner annular portion 430 preferably has a relative refractive index profile $\Delta2(r)$ having a maximum absolute magnitude less than 0.05%, and $\Delta$2MAX<0.05% and $\Delta$2MIN>−0.05%, and the depressed-index annular portion 450 begins where the relative refractive index of the cladding first reaches a value of less than −0.05%, going radially outwardly from the centerline. In some embodiments, the outer annular portion 460 has a relative refractive index profile $\Delta4(r)$ having a maximum absolute magnitude less than 0.05%, and $\Delta$4MAX<0.05% and $\Delta$4MIN>−0.05%, and the depressed-index annular portion 450 ends where the relative refractive index of the cladding first reaches a value of greater than −0.05%, going radially outwardly from the radius where $\Delta$3MIN is found.

Many modifications and other embodiments of the invention set forth herein will come to mind to one skilled in the art to which the invention pertains having the benefit of the teachings presented in the foregoing descriptions and the associated drawings. These modifications include, but are not limited to, extension to MIMO configurations extending beyond 2×2 MIMO or 4×4 MIMO to, for example, 2×3 MIMO, 4×6 MIMO, 8×8 MIMO and the like. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A method of operating an optical fiber-based wireless communication system, comprising:
    (a) determining a first plurality of remote units in a cloud bonded to a Radio-over-Fiber (RoF) communication session;
    (b) measuring at least one of a received signal strength and a data rate from each of the first plurality of remote units;
    (c) measuring at least one of a received signal strength and an estimated data rate from each of a second plurality of remote units in the cloud not bonded to the RoF communication session; and
    (d) dynamically bonding one of the second plurality of remote units to the RoF communication session if the at least one of the measured received signal strength and the estimated data rate of the one of the second plurality of remote units is greater than the at least one of the measured received signal strength and the data rate of one of the first plurality of remote units.

2. The method of claim 1, further comprising unbonding the one of the first plurality of remote units from the RoF communication session.

3. The method of claim 1, wherein the first plurality of remote units in the cloud is coupled to a service unit.

4. The method of claim 3, wherein the second plurality of remote units in the cloud is coupled to the service unit.

5. The method of claim 1, wherein the first plurality of remote units in the cloud are within a line of sight of each other.

6. The method of claim 5, wherein the second plurality of remote units in the cloud are within the line of sight.

7. The method of claim 1, wherein the RoF communication session is comprised of a Multiple Input/Multiple Output (MIMO) session.

8. The method of claim 1, wherein dynamically bonding the one of the second plurality of remote units to the RoF communication session is repeated for each of the second plurality of remote units.

9. The method of claim 2, wherein dynamically bonding the one of the second plurality of remote units and unbonding the one of the first plurality of remote units from the RoF communication session are repeated approximately every predetermined period of time.

10. The method of claim 9, wherein the predetermined period of time is less than one second.

11. A controller comprising:
    a head-end unit communicatively coupled to and configured to conduct a Radio-over-Fiber (RoF) communication session with a first plurality of remote units and a second plurality of remote units;
    where the head-end unit is configured to:
    (a) determine the first plurality of remote units in a cloud bonded to a RoF communication session;
    (b) measure at least one of a received signal strength and a data rate from each of the first plurality of remote units;
    (c) measure at least one of a received signal strength and an estimated data rate from each of the second plurality of remote units in the cloud not bonded to the RoF communication session; and
    (d) dynamically bond one of the second plurality of remote units to the RoF communication session if at least one of the measured received signal strength and the estimated data rate of the one of the second plurality of remote units is greater than the at least one of the measured received signal strength and the data rate of one of the first plurality of remote units.

12. The controller of claim 11, wherein the head-end unit is further configured to unbond the one of the first plurality of remote units from the RoF communication session.

13. The controller of claim 11, wherein the RoF communication session is comprised of a Multiple Input/Multiple Output (MIMO) session.

14. The controller of claim 11, wherein the head-end unit is further configured to repeat dynamically bonding the one of the second plurality of remote units to the RoF communication session for each of the second plurality of remote units.

15. The controller of claim 12, wherein the head-end unit is further configured to repeat dynamically bonding the one of the second plurality of remote units to the RoF communication sessions and unbonding the one of the first plurality of remote units to the RoF communication session approximately every predetermined period of time.

16. The controller of claim 15, wherein the predetermined period of time is less than one second.

17. A system, comprising:
a plurality of remote units; and
a head-end unit communicatively coupled to and configured to conduct a Radio-over-Fiber (RoF) communication session with a first plurality of remote units and a second plurality of remote units comprising a controller for directing a signal to the plurality of remote units, wherein the head-end unit is configured to:
(a) determine the first plurality of remote units in a cloud bonded to the RoF communication session;
(b) measure at least one of a received signal strength and a data rate from each of the first plurality of remote units;
(c) measure at least one of a received signal strength and an estimated data rate from each of a second plurality of remote units in the cloud not bonded to the RoF communication session; and
(d) dynamically bond one of the second plurality of remote units to the RoF communication session if at least one of the measured received signal strength and the estimated data rate of the one of the second plurality of remote units is greater than at least one of the measured received signal strength and the data rate of one of the first plurality of remote units.

18. The system of claim 17, wherein the head-end unit is further configured to unbond the one of the first plurality of remote units from the RoF communication session.

19. The system of claim 17, wherein the first plurality of remote units is coupled to a service unit.

20. The system of claim 19, wherein the second plurality of remote units is coupled to the service unit.

21. The system of claim 17, wherein the first plurality of remote units in the cloud are within line of sight of each other.

22. The system of claim 17, wherein the second plurality of remote units in the cloud are within the line of sight.

23. The system of claim 17, wherein the RoF communication session is comprised of a Multiple Input/Multiple Output (MIMO) session.

24. The system of claim 18, wherein the head-end unit is configured to repeat dynamically bonding the one of the second plurality of remote units to the RoF communication session for each of the second plurality of remote units.

25. The system of claim 19, wherein the head-end unit is configured to repeat dynamically bonding the one of the second plurality of remote units to the RoF communication session and unbonding the one of the first plurality of remote units from the RoF communication session approximately every predetermined period of time.

26. The system of claim 25, wherein the predetermined period of time is less than one second.

* * * * *